United States Patent [19]
Zarrabi

[11] Patent Number: 5,610,934
[45] Date of Patent: Mar. 11, 1997

[54] MINIATURIZED INTRACAVITY FREQUENCY-DOUBLED BLUE LASER

[75] Inventor: Joseph H. Zarrabi, Malden, Mass.

[73] Assignee: Polaroid Corporation, Cambridge, Mass.

[21] Appl. No.: 543,087

[22] Filed: Oct. 13, 1995

[51] Int. Cl.$^6$ .................................................... H01S 3/091
[52] U.S. Cl. ........................... 372/70; 372/30; 372/92; 372/98; 372/4; 372/39; 372/22
[58] Field of Search ................ 372/22, 70, 68, 372/30, 92, 98, 4, 39, 41

[56] References Cited

U.S. PATENT DOCUMENTS

| | | | |
|---|---|---|---|
| 5,038,352 | 8/1991 | Lenth et al. | 372/21 |
| 5,063,566 | 11/1991 | Dixon | 372/22 |
| 5,222,088 | 6/1993 | Amano | 372/22 |
| 5,341,393 | 8/1994 | Okazaki et al. | 372/22 |
| 5,388,114 | 2/1995 | Zarrabi et al. | 372/22 |
| 5,394,413 | 2/1995 | Zayhowski | 372/22 |
| 5,402,437 | 3/1995 | Mooradian | 372/22 |

OTHER PUBLICATIONS

G.J. Dixon et al., "432–nm source based on efficient second–harmonic generation of GaAlAs diode–laser radiation in a self–locking external resonant cavity," *Optics Letters*, Jul. 15, 1989, vol. 14, No. 14, pp. 731–733.

G.J. Dixon et al., "Efficient blue emission from an intracavity–doubled 496–nm Nd:YAG laser," *Optics Letters*, Feb. 1988, vol. 13, No. 2, pp. 137–139.

T.Y. Fan et al., "Modeling and CW Operation of a Quasi–Three–Level 946 nm Nd:YAG Laser," *IEEE Journal of Quantum Electronics*, May 1987, vol. QE–23, No. 5, pp. 605–612.

L. Goldberg et al., "High power continuous wave blue light generation in $KNbO_3$ using semiconductor amplifier seeded by a laser diode," *Appl. Phys. Lett.* 63(17), Oct. 25, 1993, pp. 2327–2329.

R.L. Gunshor et al., "Blue–green laser–diode technology moves ahead," *Laser Focus World*, Mar. 1995, pp. 97–100.

P. Günter et al., "Second–harmonic generation with $Ga_{1-x}Al_xAs$ lasers and $KNbO_3$ crystals," *Appl. Phys. Lett.* 35(6), Sep. 15, 1979, pp. 461–463.

G. Hollemann et al., "Frequency–stabilized diode–pumped Nd:YAG laser at 946 nm with harmonics at 473 and 237 nm," *Optics Letters*, vol. 19, No. 3, Feb. 1, 1994, pp. 192–194.

W.J. Kozlovsky et al., "Generation of 41 mW of blue radiation by frequency doubling of a GaAlAs diode laser," *Appl. Phys. Lett.* 56(23), Jun. 4, 1990, pp. 2291–2292.

W.P. Risk et al., "Diode laser pumped blue–light source at 473 nm using intracavity frequency doubling of a 946 nm Nd:YAG laser," *Appl. Phys. Lett.* 54(17), Apr. 24, 1989, pp. 1625–1627.

W.P. Risk, "Modeling of longitudinally pumped solid–state lasers exhibiting reabsorption losses," *J. Opt. Soc. Am. B*, vol. 5, No. 7, Jul. 1988, pp. 1412–1423.

M.J. Weber et al., "Optical Spectra and Intensities of $Nd^{3+}$ in $YAlO_3$," *Journal of Applied Physics*, vol. 42, No. 12, Nov. 1971, pp. 4996–5005.

R. Wu et al., "Diode–laser–array pumped Nd: $YAlO_3$ CW laser at 1079.5nm and 1341.4nm," *Chinese Journal of Lasers* (E.E.), vol. 1, No. 5, Oct. 1992.

*Primary Examiner*—Leon Scott, Jr.
*Attorney, Agent, or Firm*—Joseph Stecewycz

[57] ABSTRACT

A miniaturized, frequency-doubled blue laser utilizing a pump source operating within a radiation band of 780 to 820 nm, such as a Ti:sapphire laser or other suitable optical pump, to pump a gain medium comprising a crystal of neodymium-doped yttrium orthoaluminate ($Nd:YAlO_3$) and produce a fundamental radiation having a wavelength of approximately 930 nm, the fundamental radiation being subsequently frequency doubled by means of a nonlinear crystal, such as potassium niobate ($KNbO_3$), to yield output radiation at a wavelength of 465 nm.

55 Claims, 8 Drawing Sheets

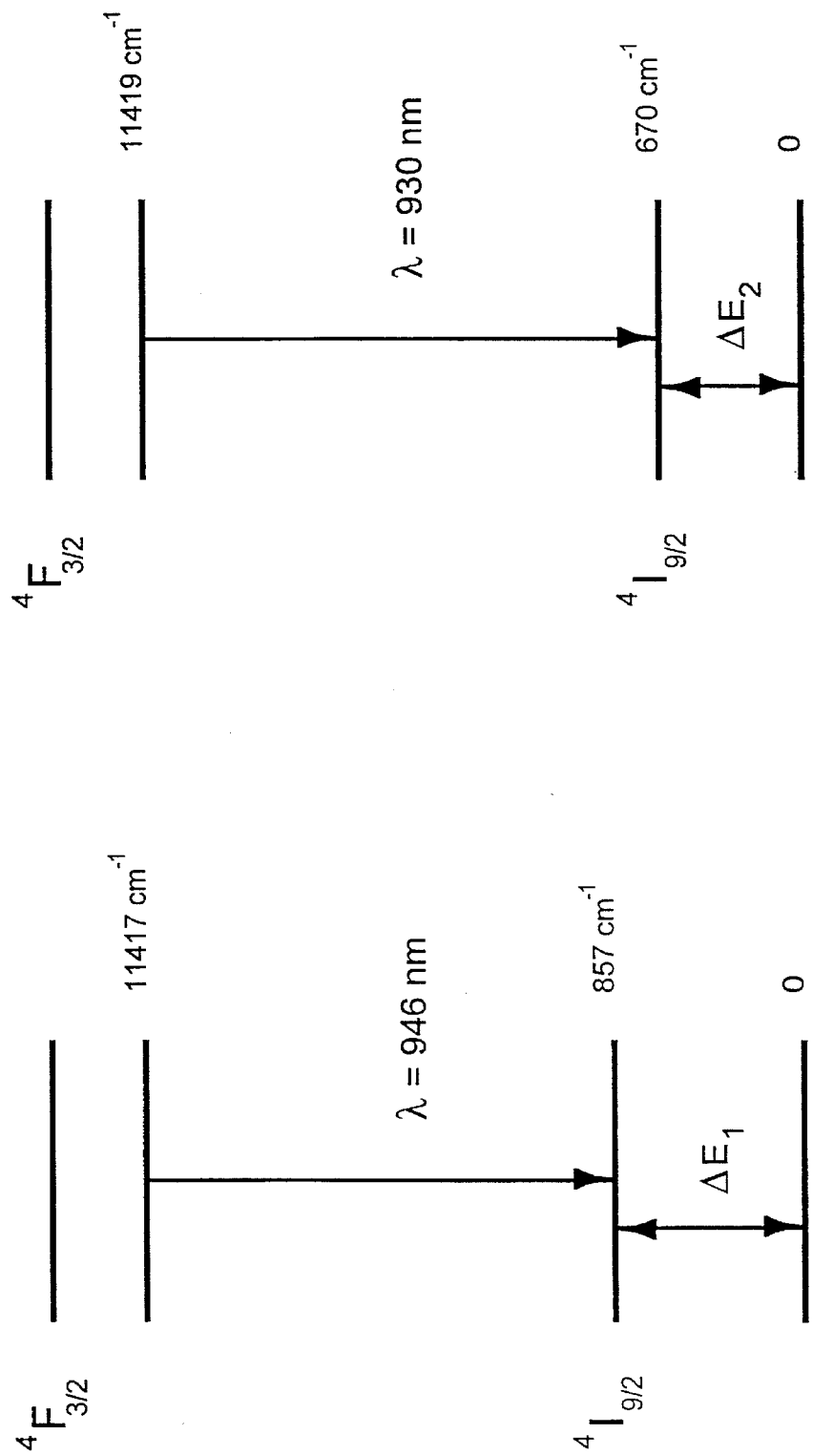

MINIATURIZED INTRACAVITY FREQUENCY-DOUBLED BLUE LASER

FIELD OF THE INVENTION

This invention relates to solid-state laser devices and, more particularly, to a miniaturized continuous-wave diode-pumped intracavity frequency-doubled microcavity laser producing optical radiation in the blue spectral region.

BACKGROUND OF THE INVENTION

Semiconductor lasers are commonly used in applications such as color display and printing systems, medical diagnostic devices, and optical data storage methods. Such applications continue to benefit from the ongoing developments being made in the field of solid-state laser technology. Currently, there is considerable interest in the development of a practical miniaturized laser which is capable of producing optical radiation in the blue spectral region (i.e., radiation having a wavelength of approximately 455 to 492 nm). As can be readily appreciated, a blue laser is particularly well-suited for a color display or printing application based on an RGB graphical format. But a more attractive feature of the blue laser is the smaller wavelength of its emitted radiation in comparison to the wavelength of the radiation produced by most conventional semiconductor lasers. An optical data storage system utilizing a blue laser, for example, is capable of providing about four times the storage capacity of a comparable system utilizing a red laser.

Blue-Light Laser Systems Disclosed in the Relevant Art

Although the prior art discloses various physical embodiments of laser systems producing optical radiation in the blue spectral region, there does not appear to have been demonstrated a blue laser which is both compact, or miniaturized, and reliably operable in a continuous-wave mode at room temperature. The term miniaturized laser is herein understood to mean a monolithic laser having mirrors formed upon opposing facets of the device. The blue laser systems disclosed in the relevant art generally fall into one of the following three configurations: i) a semiconductor laser diode directly emitting blue light; ii) a direct diode-doubling laser system comprising a pump source emitting in the infrared (IR) spectral region and a frequency-doubling component; and iii) an intracavity frequency-doubled laser system comprising an IR pump source, a gain medium, and a frequency-doubling component.

The first configuration, a directly-emitting blue laser diode, is a logical choice for achieving compactness, but a practical working and reliable device has yet to be fabricated. Recent advances in wide-bandgap II–VI compound semiconductor technology are encouraging for the development of a laser diode directly emitting blue light, as described in the reference article by Robert L. Gunshor and Arto V. Nurmikko, "Blue-green laser-diode technology moves ahead," Laser Focus World, 97–99 (March 1995). Using this technology, direct-bandgap II–VI laser-diode devices have been grown on GaAs substrates using molecular-beam epitaxy. A room-temperature continuous-wave laser was thus fabricated having the capability to operate at approximately 508 nm for about one hour. The article states that challenges confronting technologists for device improvement include increasing device lifetime and decreasing operating wavelength, and appears to indicate that a practical blue laser diode has not yet been realized.

In the second, direct-diode doubling configuration, blue-light emission is produced by the frequency doubling of infrared radiation, typically by means of a nonlinear crystal. This approach has been described in the reference article by P. Günter, P. M. Asbeck, and S. K. Kurtz, "Second-harmonic generation with $Ga_{1-x}Al_xAs$ lasers and $KNbO_3$ crystals," Appl. Phys. Lett. 35(6), 461–63 (15 Sep. 1979). Efficient second-harmonic generation was obtained from a pulsed gallium arsenide injection laser operating at room temperature. An output of approximately 0.35 mW peak harmonic power was obtained with a single-pass 860 nm input having a fundamental peak power of 785 mW. The apparatus used included optical filters for isolation and objective lenses for collimation of the injection laser output into a circular focused spot within a potassium niobate crystal.

A subsequent diode-doubling laser design, incorporating a potassium niobate crystal used to frequency double an 865 nm output from a GaAlAs laser diode, was disclosed by G. J. Dixon et al. in the reference article, "432-nm source based on efficient second-harmonic generation of GaAlAs diode-laser radiation in a self-locking external resonant cavity," Opt. Lett. 14, 731–33 (15 Jul. 1989). A self-locking technique was demonstrated in which a portion of the resonant intracavity field was provided as feedback to the pump source, thus causing the pump source to lock frequency to a resonant frequency of the cavity. A conversion efficiency of 1.7% and good spatial beam quality was reported. This configuration used a dichrotic mirror at the output of the potassium niobate crystal to reflect a portion of the fundamental frequency and provide the necessary feedback.

In an alternative embodiment, a monolithic ring resonator of potassium niobate was used to frequency double a single-mode 856 nm laser diode output as disclosed by W. J. Kozlovsky et al. in the reference article, "Generation of 41 mW of blue radiation by frequency doubling of a GaAlAs diode laser," Appl. Phys. Lett. 56(23), 2291–92 (4 Jun. 1990). A special electronic servo technique was devised by which the fundamental diode pump frequency was locked to the resonance of the potassium niobate cavity to obtain stable generation of blue radiation. An optical isolator was emplaced between the laser diode and the resonator to prevent back-reflected and scattered light from impinging upon the pump source.

Goldberg et al., in the reference article "High power continuous wave blue light generation in $KNbO_3$ using semiconductor amplifier seeded by a laser diode," Appl. Phys. Lett. 63(17), 2327–29 (25 Oct. 1993) demonstrated that a further increase in power could be achieved by means of a broad area semiconductor amplifier. Pulsed pump energy provided by a Ti:sapphire laser was injected into a GaAlAs amplifier which illuminated a potassium niobate crystal and produced approximately 3 W of peak power. An optical isolator was provided between the pump source and the amplifier. For continuous-wave operation at lower power levels, a monolithically integrated master-oscillator power amplifier was used to generate coherent blue radiation using the potassium niobate crystal as a frequency doubler.

Although the emission of blue light by means of direct diode-doubling laser systems has been demonstrated, the above-described embodiments of this particular configuration require various external optical components and feedback subsystems to maintain lasing operation. As a consequence, miniaturization of any of these embodiments does not appear to be imminently feasible.

Intracavity Frequency-Doubled Blue Laser

The third, intracavity frequency-doubled configuration, most commonly operates by means of the intracavity frequency doubling of 946 nm emission resulting from the $^4F_{3/2}$ to $^4I_{9/2}$ energy level transition in a neodymium-doped yttrium aluminum garnet (hereinafter Nd:YAG) laser system. G. J. Dixon et al. have reported in the technical letter "Efficient blue emission from an intracavity-doubled 946-nm Nd:YAG laser," Opt. Lett. 13, 137–39 (February 1988) that a 5 mW power level of 473 nm optical radiation had been obtained from a Nd:YAG laser operating at 946 nm and pumped by a dye laser. The letter relates that a potassium niobate crystal was positioned between the Nd:YAG laser and an external output optical coupler, where the coupler had been coated for high reflectivity at wavelength 946 nm and for high transmission at 473 and 1060 nm. Efficient intracavity doubling was achieved with the potassium niobate crystal held near a phase-matching temperature of 185° C.

In another embodiment, a blue-light laser system producing 3.1 mW of output when operating at room temperature was reported by W. P. Risk et al. in the technical letter "Diode laser pumped blue-light source at 473 nm using intracavity frequency doubling of a 946 nm Nd:YAG laser," Appl. Phys. Lett. 54(17) 1625–27 (24 Apr. 1989). An external output optical mirror used in this design had a transmission of 0.1% at 946 nm and sufficient transmission at 1064 nm to suppress oscillation of the $^4F_{3/2}$ to $^4I_{11/2}$ transition in the neodymium ion, a transition having a gain cross section approximately ten times higher than that of the $^4F_{3/2}$ to $^4I_{9/2}$ transition.

A more recent embodiment is a blue laser described by G. Hollemann et al. in the technical letter "Frequency-stabilized diode-pumped Nd:YAG laser at 946 nm with harmonics at 473 and 237 nm," Opt. Lett. 19, 192–94 (1 Feb. 1994). This letter explains that a Nd:YAG laser had been emplaced between two quarter-wave plates so as to produce single-mode operation within the laser cavity. The cavity was constructed with two foci to provide optimum beam waists in the Nd:YAG gain medium and in a potassium niobate frequency-doubling crystal. The disclosed setup resulted in a single-mode output power of 100 mW at a wavelength of 473 nm.

To summarize, emission of blue light by means of intracavity frequency-doubling laser systems has been demonstrated but, like the direct diode-doubling laser systems described above, the disclosed intracavity laser systems also require various external optical components to maintain lasing operation. As a consequence, miniaturization of an intracavity blue laser system does not yet appear to have been achieved in the relevant art.

What is needed is a compact source of coherent blue-light radiation which can be operated at a power density sufficiently large for use in color display and printing systems, medical diagnostic devices, optical data storage methods, and similar applications.

It is therefore an object of the present invention to provide a miniaturized intracavity frequency-doubled blue laser which provides a continuous-wave output.

It is a further object of the invention to provide such a laser which is operable at room temperature.

It is a further object of the invention to provide such a laser which can operate without the need for external optical components or feedback subsystems.

Other objects of the invention will, in part, appear hereinafter and will, in part, be apparent when the following detailed description is read in connection with the drawings.

SUMMARY OF THE INVENTION

The present invention is a miniaturized, frequency-doubled blue laser which utilizes a pump source operating within a radiation band of 780 to 820 nm, such as a Ti:sapphire laser or other suitable optical pump, to pump a gain medium comprising a crystal of neodymium-doped yttrium orthoaluminate (Nd:YAlO$_3$) such that a fundamental radiation having a wavelength of approximately 930 nm is produced, the fundamental radiation being subsequently frequency doubled by means of a nonlinear crystal, such as potassium niobate (KNbO$_3$), to yield output radiation at a wavelength of 465 nm. The laser configuration can also be modified to generate coherent radiation of wavelength 1.079 μm or 1.341 μm to a nonlinear crystal such as potassium titanyl phosphate (KTP) or yttrium aluminum borate (YAB) for frequency doubling to yield an output of green light or red light respectively.

BRIEF DESCRIPTION OF THE DRAWINGS

The novel features that are considered characteristic of the present invention are set forth with particularity herein. The organization and method of operation of the invention, together with other object and advantages thereof, will be best understood from the following description of the illustrated embodiments when read in conjunction with the accompanying drawings wherein:

FIG. 1 is an energy-level diagram of a Nd$^{3+}$ ion in a Nd:YAG crystal illustrating the emission of radiation at a wavelength of 946 nm produced by a $^4F_{3/2}$ to $^4I_{9/2}$ energy level transition;

FIG. 2 is an energy-level diagram of a Nd$^{3+}$ ion in a Nd:YAlO$_3$ crystal illustrating the emission of radiation at a wavelength of 930 nm produced by a $^4F_{3/2}$ to $^4I_{9/2}$ energy level transition;

DETAILED DESCRIPTION OF THE INVENTION

Figure 3:
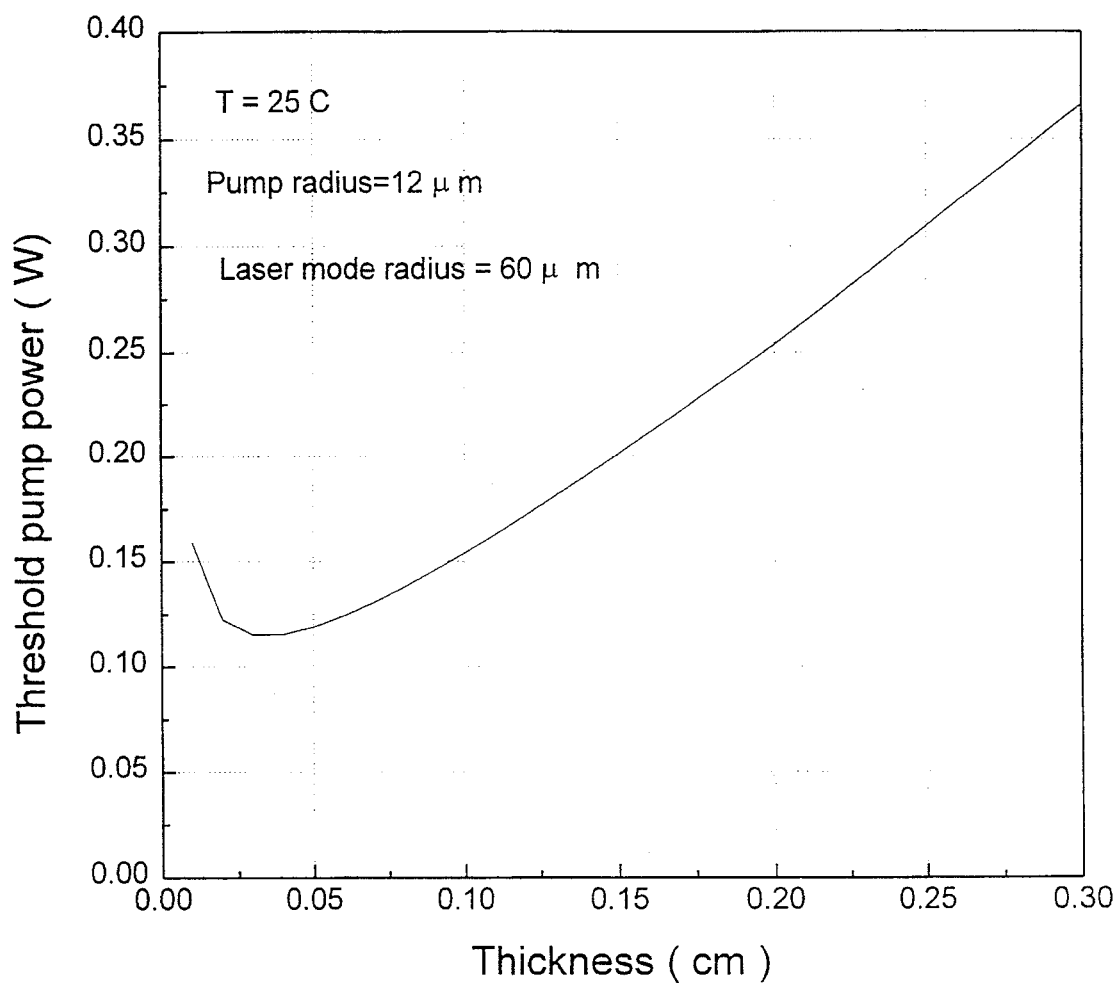
FIG. 3 is a graph showing the calculated threshold pump power required to achieve a lasing state in a Nd:YAlO$_3$ gain medium at a wavelength of 930 nm as a function of crystal thickness.

In a conventional intracavity-doubled laser system as described above, blue-light emission is produced by the frequency doubling of fundamental IR radiation having a wavelength of 946 nm. This fundamental radiation is produced by inducing the $^4F_{3/2}$ to $^4I_{9/2}$ energy level transition of an active $Nd^{3+}$ ion in a Nd:YAG crystal as shown in FIG. 1.

The present invention is a miniaturized solid-state laser utilizing a cavity comprising an etalon of neodymium-doped yttrium orthoaluminate (hereinafter Nd:YAlO$_3$) to produce coherent IR radiation having a wavelength of either 930 nm, 1.079 μm, or 1.341 μm. Preferably, the doping comprises a one to two percent atomic doping level. The IR radiation is subsequently frequency doubled by means of a suitable nonlinear crystal to yield blue light at 465 nm, green light at 539 nm, or red light at 670 nm, as described in greater detail below.

In a preferred embodiment, blue-light emission at 465 nm is produced by the frequency doubling of fundamental IR radiation having a wavelength of approximately 930 nm. The fundamental radiation is obtained by means of the $^4F_{3/2}$ to $^4I_{9/2}$ energy level transition of an active $Nd^{3+}$ ion in the Nd:YAlO$_3$ laser cavity from an upper manifold level having a Stark-level energy of 11,419 cm$^{-1}$ to a lower energy level of 670 cm$^{-1}$, as shown in FIG. 2.

Optical pumping of Nd:YAlO$_3$ to produce the 930 nm emission has not been considered in the relevant art because of the technical challenges presented in achieving the corresponding $^4F_{3/2}$ to $^4I_{9/2}$ energy level transition in Nd:YAG. As explained in the paper by W. P. Risk, "Modeling of longitudinally pumped solid-state lasers exhibiting reabsorption losses," J.Opt. Soc. Am. B, vol. 5, No. 7, 1412, at 1421 (July 1988), the $^4I_{9/2}$ energy level has a significant thermal population at room temperature. Thus, a nonnegligible reabsorption loss is present.

Achieving the $^4F_{3/2}$ to $^4I_{9/2}$ energy level transition in a Nd:YAlO$_3$ crystal appears to be more difficult than achieving this transition in Nd:YAG because the corresponding $^4I_{9/2}$ energy level population is even greater in Nd:YAlO$_3$ than it is in Nd:YAG. As is well-known in the relevant art, the thermal population $N_1$ of an energy level is related to $N_0$, the population density of the ground state, by a Boltzman distribution of the form, $$N_1 = N_0 \exp\left(-\frac{\Delta E}{kT}\right).$$

At 25° C., energy-level difference $\Delta E_2$ for Nd:YAlO$_3$ is approximately 0.083 eV for the 670 cm$^{-1}$ energy level, which is smaller than the corresponding energy-level difference $\Delta E_1$ of 0.105 eV for the 857 cm$^{-1}$ energy level of Nd:YAG, as shown in FIG. 1. Consequently, both the thermal population at the $^4I_{9/2}$ energy level and the related reabsorption loss in the gain medium is proportionally greater in Nd:YAlO$_3$ than in Nd:YAG. The greater reabsorption loss in Nd:YAlO$_3$ indicates that a proportionately higher threshold pump power is required to produce lasing in Nd:YAlO$_3$ in comparison to the level of pump energy producing lasing in Nd:YAG. In view of the technical challenges presented in achieving the $^4F_{3/2}$ to $^4I_{9/2}$ energy level transition in Nd:YAG, it is understandable why there does not appear to have been any previous effort to develop an intracavity frequency-doubled blue laser device utilizing the $^4F_{3/2}$ to $^4I_{9/2}$ energy level transition in a Nd:YAlO$_3$ gain medium.

In an earlier technical article by M. J. Weber and T. E. Varitimos, "Optical Spectra and Intensities of Nd$^{3+}$ in YAlO$_3$," J.Appl. Phys., vol. 42, no. 12, 4996, at 5004 (November 1971) a similar conclusion was drawn regarding the impediment presented by the size of the thermal population found at room temperature. Weber et al. stated that a low temperature would be required if the $^4F_{3/2}$ to $^4I_{9/2}$ energy level transition is to be realized in a Nd:YAlO$_3$ crystal. The prior art thus has taught that a Nd:YAlO$_3$ laser system sustaining the $^4F_{3/2}$ to $^4I_{9/2}$ energy level transition is not feasible if the laser is to operate at room temperature.

In the present invention, this transition is successfully achieved at room temperature by optimizing the design parameters of the laser cavity such that pump power sufficient to produce lasing in the Nd:YAlO$_3$ crystal can be provided by an existing pump source. Moreover, the fundamental radiation emitted from a Nd:YAlO$_3$ gain medium is polarized radiation. Consequently, a four-times improvement can be realized when frequency doubling infrared radiation into blue radiation in comparison to a Nd:YAG system in which the fundamental infrared radiation is unpolarized.

The threshold pump power $P_{th}$ for a solid-state gain medium, such as Nd:YAlO$_3$, can be expressed as the following function of crystal thickness L:

$$P_{th}(L) = \frac{h\nu(A_P^2 + A_L^2)\text{ [cavity loss factor]}}{4\sigma f_2 \tau\, [1 - \exp(-2\alpha L)]}$$

where $A_P$ is the cross-sectional area of the pump beam, $A_L$ is the laser mode cross section, $\sigma$ is the emission cross section, $f_2$ is the fractional population in the $^4I_{9/2}$ energy level, $\tau$ is the lifetime in the $^4F_{3/2}$ energy level, and $\alpha$ is the absorption coefficient at the pump wavelength.

The cavity loss factor comprises the sum of fundamental radiation losses resulting from scattering, cavity mirror reflectivities, and resonant loss. Scattering loss, which is a function of the gain medium used, is estimated to be 0.001 for 930 nm radiation. Mirror loss can be found from the relationship, $$\text{mirror loss} = \ln(R_1 \cdot R_2)$$

where $R_1$ is the reflectivity of the cavity input mirror and $R_2$ is the reflectivity of the output mirror. In the present invention, the laser cavity comprises coated facets having reflectivities of at least 99.5% at the fundamental wavelength of 930 nm to give a mirror loss of less than 0.01.

Resonant loss can be determined from the equation, $$\text{resonant loss} = 2\sigma L n_0 \exp\left(-\frac{\Delta E_2}{kT}\right)$$

where $n_0$ is the total neodymium dopant concentration. For a 1% atomic doping level, $n_0$ is about $1.96 \times 10^{20}$ cm$^{-3}$. The emission cross section $\sigma$ is about $3.4 \times 10^{-20}$ cm$^2$. At 25° C., the energy-level difference $\Delta E_2$ is approximately 0.083 eV and the product kT is approximately 0.025 eV. At room temperature, resonant loss becomes approximately 13.3 cm$^{-1}$×L and the quantity (0.011+13.3 L) can be used for the cavity loss factor. For applications in which the invention is practiced at very low temperatures, the resonant loss becomes negligible and results in a cavity loss factor on the order of 1.1%.

Using nominal values for fractional population $f_2$ of 0.6, lifetime $\tau$ of 1.45×10$^{-4}$ sec, and absorption coefficient $\alpha$ of 10 cm$^{-1}$, the preferred minimum pump power for a room-temperature laser device according to the present invention can be expressed as:

$$P_{th}(L) \approx \left( 2.1 \times 10^4 \frac{\text{watt}}{\text{cm}^2} \right) \frac{(A_P^2 + A_L^2)(0.011 + 13.3L)}{1 - e^{-20L}}$$

where crystal thickness L is given in centimeters. This expression can be plotted to yield the graph of FIG. 3 for a pump beam radius of 12 μm and a laser mode radius of 60 μm. The resulting curve indicates that a lasing state can be achieved in a Nd:YAlO$_3$ gain medium of thickness 0.02 to 0.04 cm with a minimum calculated pump power level of about 120 mW.

Preferred Embodiment of the Blue Laser

Figure 4:
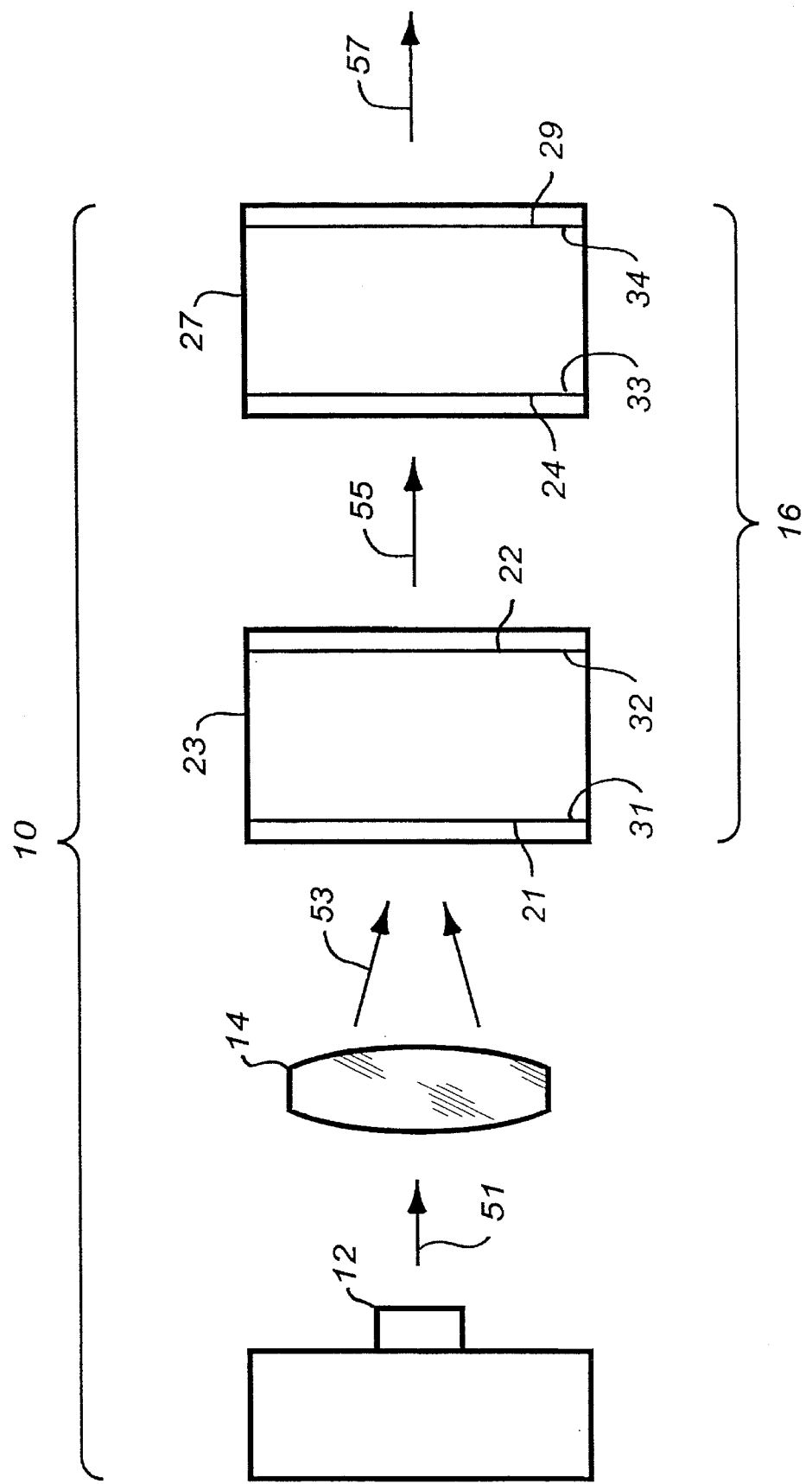
FIG. 4 is a diagrammatical illustration of a blue microcavity laser according to the invention comprising a pump source, mode-matching optics, and a laser cavity comprising a Nd:YAlO$_3$ gain medium lasing at 930 nm and a nonlinear crystal operating as a frequency doubler to produce a 465 nm output.

There is shown in FIG. 4 a diagram of a blue microcavity laser 10, in accordance with the present invention. Laser 10 is optically pumped by a source 12 which produces a continuous-wave radiation 51 having a wavelength of 780 to 820 nm.

Pump radiation 51 passes through a mode-matching optics 14 and emerges as a mode-matched beam 53 which is directed into a laser cavity 16. In a preferred embodiment, mode-matching optics 14 comprises a convex lens having a focal length of approximately 25 mm which produces a spot size of about 25 μm at a flat cavity input facet 21.

Laser cavity 16 comprises a Nd:YAlO$_3$ gain medium 23 and a nonlinear crystal 27, such as potassium niobate (KNbO$_3$). Gain medium 23 is a Nd:YAlO$_3$ crystal cut along either the a-axis or the b-axis. Material cut along the c-axis can be used as well, but operation of such a gain cavity will require a comparatively higher pump power. Gain medium 23 is positioned such that its a-axis is parallel to the polarization of pump radiation 51.

Lasing activity in gain medium 23 produces a fundamental radiation 55 of wavelength 930 nm. Cavity input facet 21 is coated with an input optical layer 31 to provide a reflectivity of at least 99.9% at the fundamental radiation wavelength of 930 nm, a transmission of at least 80% at the pump radiation wavelength, and a reflectivity of at least 90% at the output radiation wavelength. An optical layer 32 is provided at a gain medium output facet 22. Optical layer 32 has a reflectivity of at least 80% at the pump radiation wavelength (i.e., a double-pass pump radiation configuration) and has reflectivities of less than 2% at the fundamental and the second harmonic wavelengths.

Laser cavity 16 also comprises a flat cavity output facet 29 parallel to cavity input facet 21. Output facet 29 is coated with an output optical layer 34 to provide a reflectivity of at least 99.9% at the fundamental radiation wavelength of 930 nm and a transmission of at least 90% at the blue output radiation wavelength. Preferably, output optical layer 34 also serves to suppress the presence of other lasing frequencies by producing a reflectivity of no more than 10% at wavelength 1.079 μm and no more than 50% at wavelength 1.341 μm. An optical layer 33 is provided at a nonlinear crystal input facet 24 having less than 2% reflectivities at both the fundamental and the second harmonic wavelengths. In alternative embodiments to the present invention, either or both of cavity facets 21 and 29 can be a curved surface, where the radius of curvature is such that a stable laser cavity is formed.

Gain medium 23 and nonlinear crystal 27 are maintained in spaced relationship to one another such that the desired laser mode cross section can be obtained by adjusting the length of laser cavity 16. Nonlinear crystal 27 is cut for type-I phase matching at 930 nm. For KNbO$_3$, fundamental radiation 55 is polarized in the a-b plane of nonlinear crystal 27 and is oriented to propagate at about 36° from the b-axis, towards the a-axis. Alternatively, nonlinear crystal 27 can be beta barium borate (β-BaB$_2$O$_4$ or BBO) with a propagation angle of about 25°, yttrium aluminum borate (YAl$_3$(BO$_3$)$_4$ or YAB) with a propagation angle of about 33°, or any similarly suitable nonlinear crystal.

Output radiation 57, which has a nominal wavelength of approximately 465 nm, can be frequency-tuned with an application of thermal or mechanical stress to gain medium 23. The power $P_2$ of output radiation 57 is essentially proportional to the thickness $L_N$ of nonlinear crystal 27 and to the fundamental intracavity power $P_C$. Generally, nonlinear crystal 27 will have a thickness $L_N$ of at least 0.10 cm. The calculated output power produced by the laser device can be determined from an equation of the form:

$$P_2(L_N, P_C) = \left[ \frac{2\omega^2(d_{eff})2k_\omega L_N^2}{\pi n_f^2 n_h \epsilon_0 c^3} \right] \cdot h(B,\xi) \cdot P_C^2$$

where $\omega$ and $k_\omega$ are the frequency and wave vector of the fundamental radiation, $n_f$ and $n_h$ are the refractive indices of the nonlinear crystal at the fundamental wavelength 930 nm and harmonic 465 nm respectively, $d_{eff}$ is the effective nonlinear coefficient $\epsilon_0$ is the permittivity of free space, and $h(B,\xi)$ is a parameter which depends on a walk-off parameter B and a focusing parameter $\xi$. Fundamental intracavity power $P_C$ is a function of the power emitted from the gain medium $P_{out}$:

$$P_C = \frac{P_{out}}{1 - R_2}$$

where $R_2$ is the reflectivity of the output mirror, as above. This can also be expressed as:

$$P_C = \frac{(P_{pump} - P_{th}) \cdot SE}{1 - R_2}$$

where $P_{th}$ is the threshold pump power and SE is slope efficiency.

Figure 5:
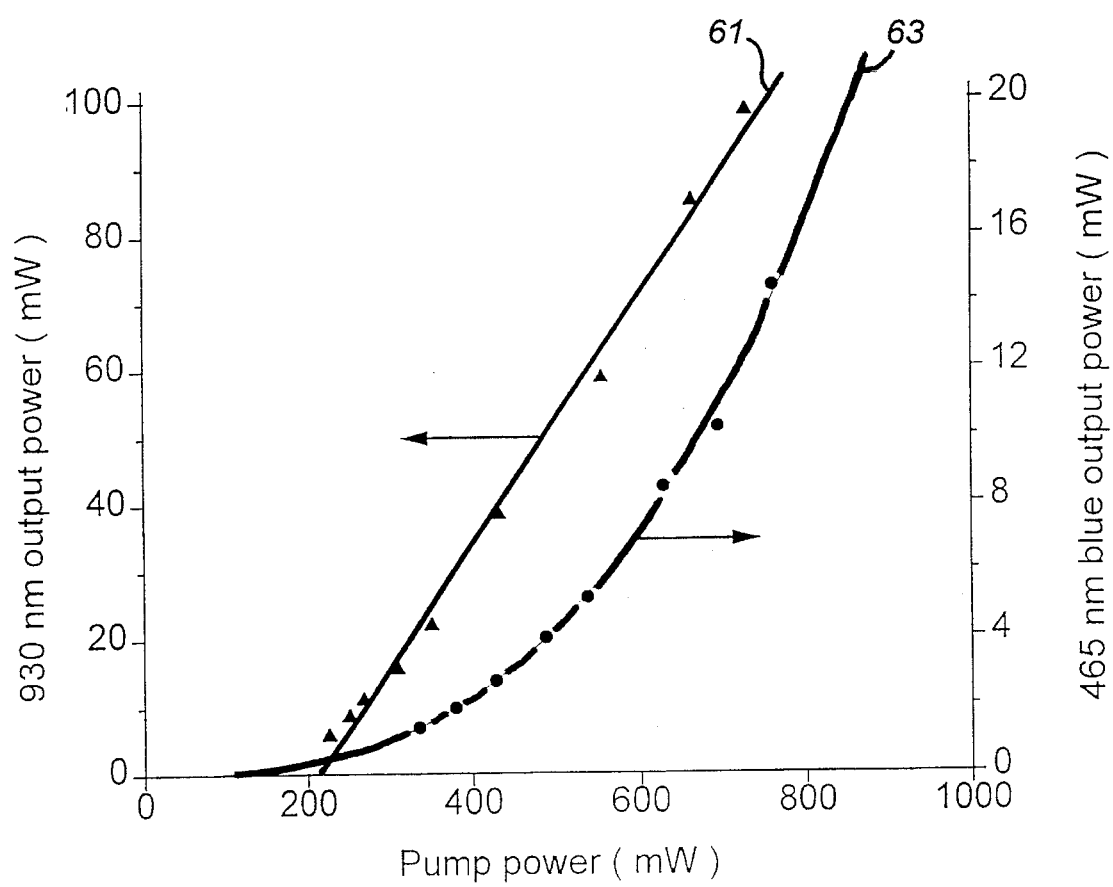
FIG. 5 is a graph providing two curves illustrating operating characteristics of the blue laser of FIG. 4, one curve showing fundamental radiation output power produced by the laser plotted along the left ordinate axis as a function of pump power and the other curve showing blue output power of the laser plotted along the right ordinate axis.

FIG. 5 is a graph of empirical data obtained from a laser device generally fabricated in accordance with design parameters described above for blue microcavity laser 10. A Ti sapphire laser operating at a wavelength of 813.2 nm was used as an optical pump. The gain medium comprised a 0.12 cm etalon and an available KNbO$_3$ crystal 0.12 cm in thickness cut for phase matching at 913 nm was used as the frequency-doubling element. The graph quantitatively illustrates the increase in output power obtained with an increase in pump power provided to the laser device. Curve 61 represents the fundamental output radiation power emitted from the microcavity laser as a function of pump power. Curve 63 represents the blue output radiation power emitted from the microcavity laser as a function of pump power. It can be seen from the graph that a pump power level of about 750 mW produced an emission of more than 100 mW at the fundamental frequency and an output of at least 15 mW of blue light in the fabricated device.

Alternative Embodiments Producing Blue Light

Figure 6:
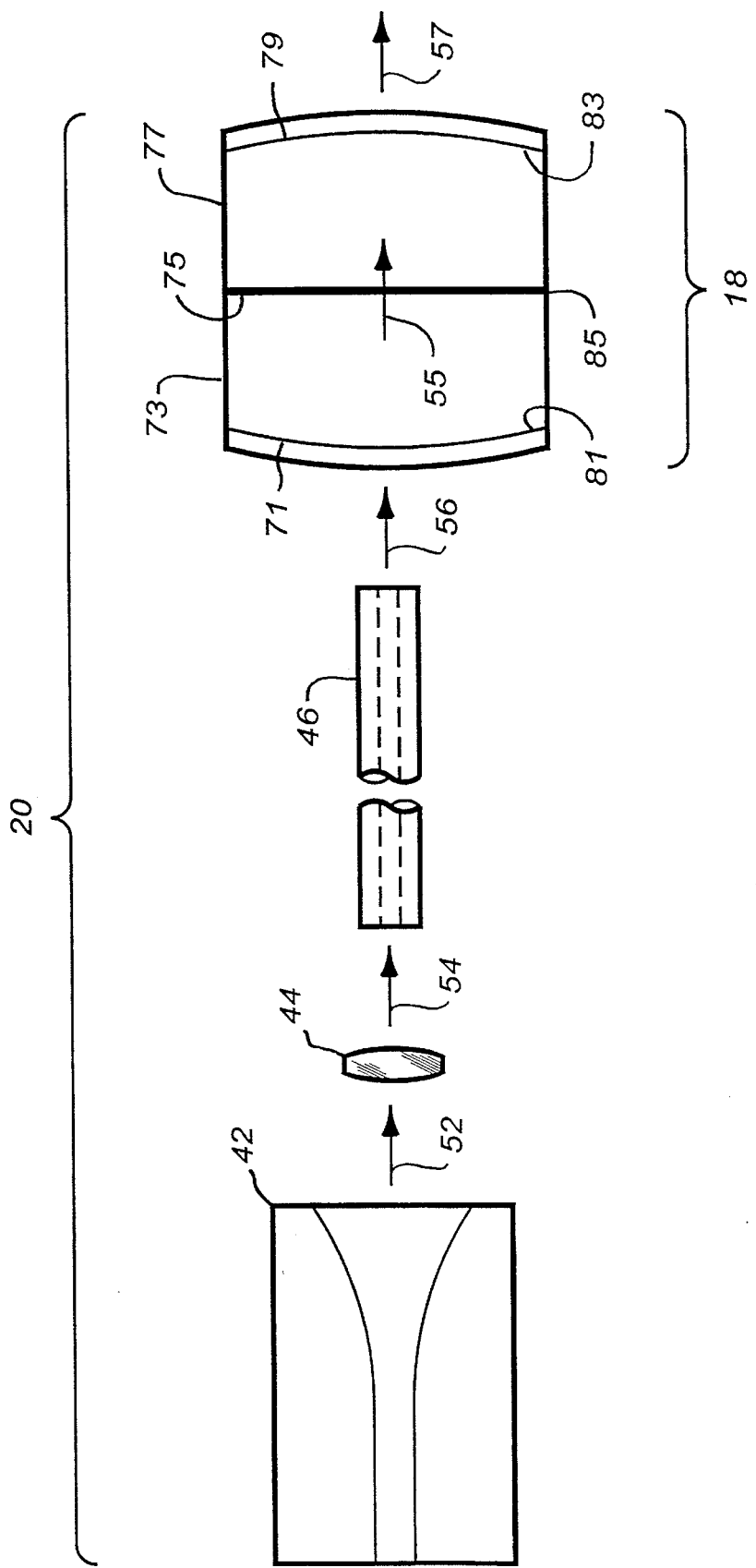
FIG. 6 is a diagrammatical illustration of an alternative embodiment of the blue laser of FIG. 4 in which a master oscillator power amplifier (MOPA) is used as the pump source, curved mirror surfaces are used to form the laser cavity, and the gain medium is positioned in optical contact with the nonlinear crystal.

FIG. 6 is a diagram of an alternative blue microcavity laser 20 according to the present invention. Laser 20 is optically pumped by means of a master oscillator power amplifier (MOPA) pump source 42 which emits pump radiation 52 having a wavelength of from 780 to 820 nm. Laser 20 can also be optically pumped by a laser diode source, such as that utilized in the preferred embodiment. Pump radiation 52 passes through mode-matching optics 44 and is emitted as mode-matched radiation 54. Preferably, radiation side lobes are filtered from mode-matched radiation 54 by transmittal through an optional optical fiber 46. Filtered mode-matched radiation 56 from optical fiber 46 is directed into a laser cavity 18 to produce fundamental radiation 55. Laser cavity 18 comprises a Nd:YAlO$_3$ gain medium 73 and a nonlinear crystal 77, such as that used in the preferred embodiment, placed into optical contact at an interface 75. An index-matching fluid 85 at interface 75 provides for an optical transition between the indices of refraction of gain medium 73 and nonlinear crystal 77. Fundamental radiation 55 is frequency doubled by means of nonlinear crystal 77 to produce output radiation 57.

In the configuration shown, laser cavity 18 comprises curved mirror surfaces, where the radii of the surfaces are selected such that a stable cavity results. A cavity input facet 71 is coated with an input optical layer 81 to provide a reflectivity of at least 99.9% at the fundamental radiation wavelength of 930 nm and a transmission of at least 80% at the pump radiation wavelength. A cavity output facet 79 is coated with an output optical layer 83 to provide a reflectivity of at least 99.9% at the fundamental radiation wavelength and a transmission of at least 90% at the output radiation wavelength. Alternatively, either or both cavity facets 71 and 79 can be flat.

Figure 7:
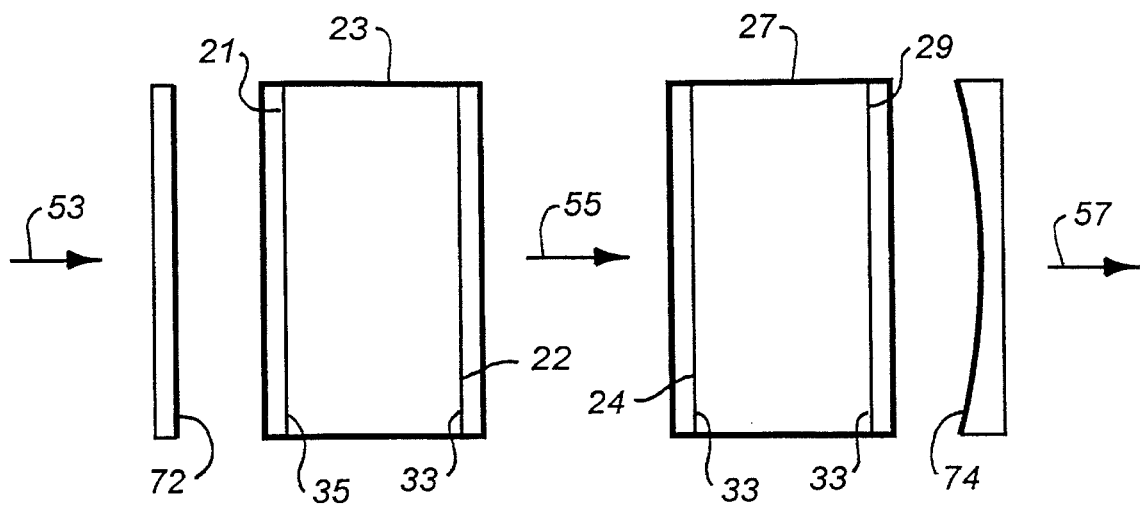
FIG. 7 is a diagrammatical illustration of an alternative embodiment of the laser cavity of FIG. 4 in which external mirror surfaces are utilized.

For applications in which greater control over the laser mode cross section is required, the laser cavities shown for the above embodiments can be replaced by a laser cavity configuration comprising one or two external mirrors. There is shown in FIG. 7 a laser cavity 66 comprising Nd:YAlO$_3$ gain medium 23, nonlinear crystal 27, an input optical layer 72, and an output optical layer 74. Pump radiation, such as mode-matched beam 53, is convened into blue output radiation 57 at a wavelength of 465 nm. Input optical layer 72 provides a reflectivity of at least 99.5% at the fundamental radiation wavelength of 930 nm, a reflectivity of at least 90% at the output radiation wavelength, and a transmission of at least 80% at the pump radiation wavelength. Cavity input facet 21 is coated with a gain medium optical layer 35 to give a transmission of at least 80% at the pump radiation wavelength and reflectivities of less than 2% at the fundamental and second harmonic wavelengths. Optical layers 33 are provided at gain medium output facet 22, nonlinear crystal input facet 24, and cavity output facet 29 to give reflectivities of less than 2% at the fundamental and second harmonic wavelengths. Output optical layer 74 provides a reflectivity of at least 99.5% at the fundamental radiation wavelength and a transmission of at least 90% at the output radiation wavelength. Alteratively, optical layer 72 can be flat or optical layer 74 can be curved.

Figure 8:
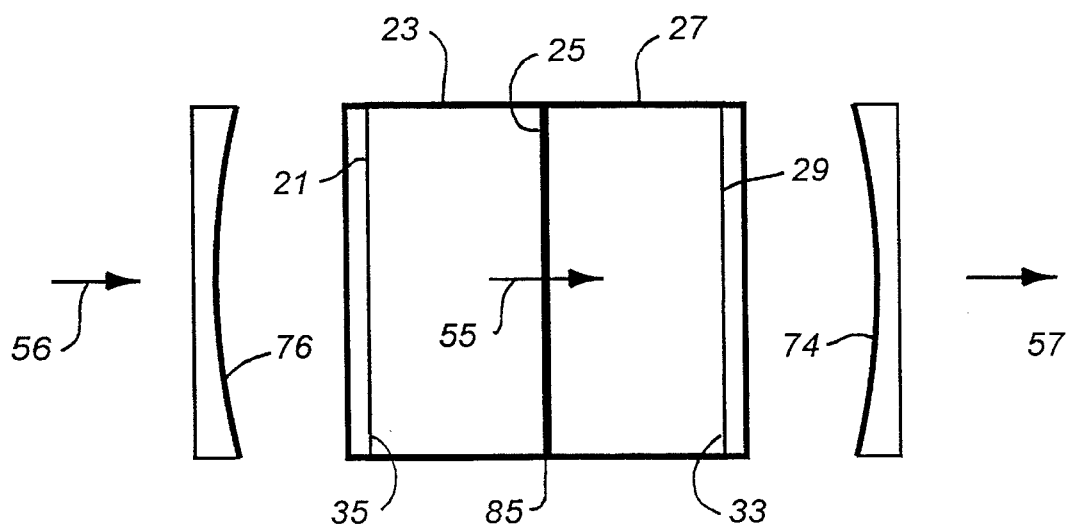
FIG. 8 is a diagrammatical illustration of an alternative embodiment of the laser cavity of FIG. 6 comprising two external curved mirror surfaces.

In yet another embodiment, a laser cavity 68, in FIG. 8, comprises Nd:YAlO$_3$ gain medium 23, nonlinear crystal 27, and two curved external mirror surfaces. Pump radiation, such as mode-matched beam 56, is converted into blue output radiation 57. An input optical layer 76 provides a reflectivity of at least 99.5% at the fundamental radiation wavelength of 930 nm, a reflectivity of at least 90% at the output radiation wavelength, and a transmission of at least 80% at the pump radiation wavelength. Cavity input facet 21 is coated with gain medium optical layer 35. Gain medium 23 and nonlinear crystal 27 are optically coupled by means of an index-matching fluid 85 at an interface 25. Cavity output facet 29 is coated with optical layer 33. Alternatively, either or both input optical layer 76 and output optical layer 74 can be flat rather than curved as shown.

Alternative Embodiments Producing Green and Red Light

Figure 9:
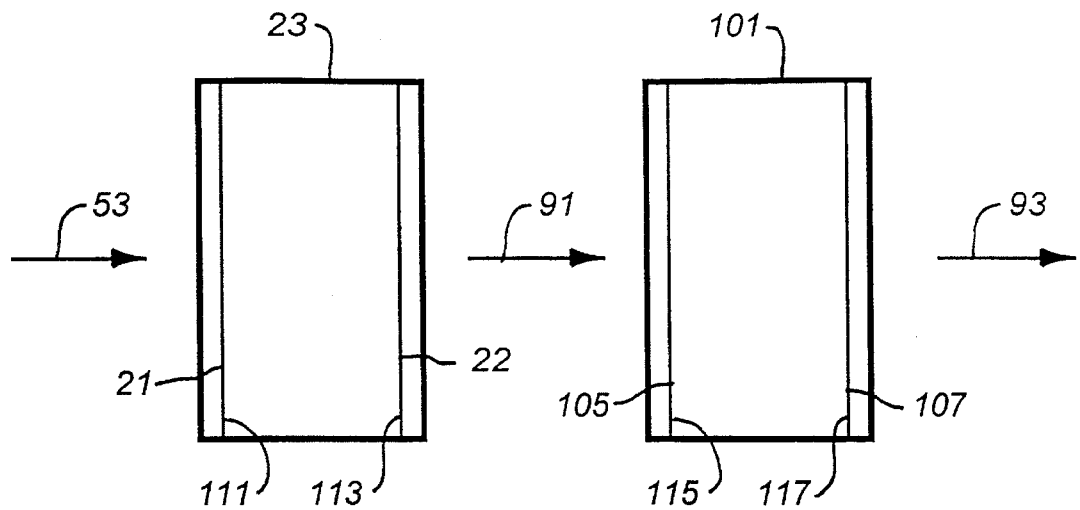
FIG. 9 is a diagrammatical illustration of a laser cavity utilized in a green laser according to the present invention in which fundamental radiation at 1.079 μm is frequency doubled to 539 nm.

The embodiments disclosed above can be modified so as to produce an output radiation other than blue light. Coherent green light can be obtained by replacing laser cavity 16 in FIG. 4, or laser cavity 18 in FIG. 6, with a green laser cavity 116, shown in FIG. 9. Green laser cavity 116 comprises Nd:YAlO$_3$ gain medium 23 and a nonlinear crystal 101, such as potassium titanyl phosphate (KTiOPO$_4$ or KTP), lithium triborate (LiB$_3$O$_5$ or LBO), BBO, lithium niobate (LiNbO$_4$), or barium sodium niobate (BaNaNb$_5$O$_{12}$). Pump radiation, such as mode-matched beam 53, produces lasing in gain medium 23 from which a fundamental radiation 91 having a wavelength of 1.079 μm is emitted. Fundamental radiation 91 is frequency doubled by means of nonlinear crystal 101 to produce a green output radiation 93 of wavelength 539 nm.

Cavity input facet 21 is coated with an input optical layer 111 to provide a reflectivity of at least 99.5% at the fundamental radiation wavelength and a reflectivity of at least 90% at the output radiation wavelength. An optical layer 113 is provided at gain medium output facet 22. Optical layer 113 has a reflectivity of at least 80% at the pump radiation wavelength and has reflectivities of less than 3% at the fundamental and the second harmonic wavelengths.

A flat cavity output facet 107 is parallel to cavity input facet 21. Output facet 107 is coated with an output optical layer 117 to provide a reflectivity of at least 99.5% at the fundamental radiation wavelength and a transmission of at least 90% at the green output radiation wavelength of wavelength 539 nm.

An optical layer 115 is provided at a nonlinear crystal input facet 105 to provide antireflection properties of less than 3% at the fundamental and the second harmonic wavelengths. Alternatively, either or both of cavity facets 21 and 107 can be a curved surface, where the radius of curvature is such that a stable laser cavity is formed. Moreover, gain medium 23 and nonlinear crystal 101 can be placed into optical contact, without optical layers 113 and 115, to form a configuration similar to that of laser cavity 18 in FIG. 6.

Figure 10:
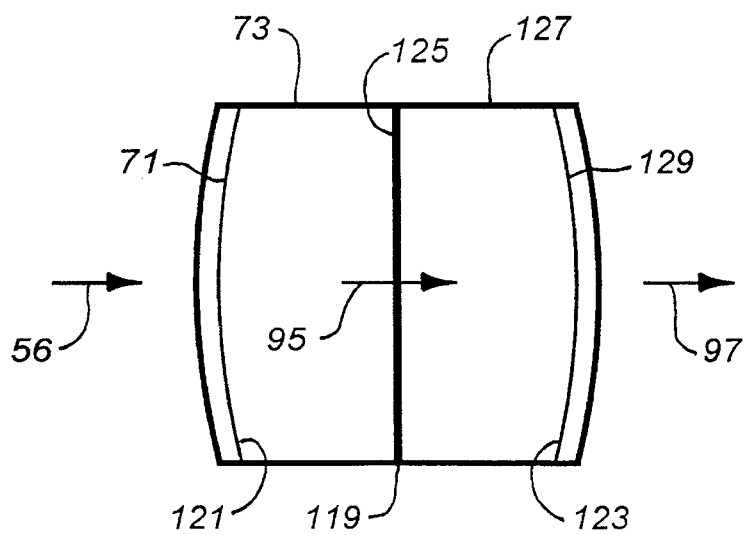
FIG. 10 is a diagrammatical illustration of a laser cavity utilized in a red laser according to the present invention in which fundamental radiation at 1.341 μm is frequency doubled to 670 nm.

Coherent red light can be obtained by replacing laser cavity 16 in FIG. 4, or laser cavity 18 in FIG. 6, with a red laser cavity 118, shown in FIG. 10. Laser cavity 118 comprises Nd:YAlO$_3$ gain medium 73 and a nonlinear crystal 127 comprised of material such as YAB, LBO, or BBO. Pump radiation, such as mode-matched radiation 56, produces lasing in gain medium 73 from which a fundamental radiation 95 having a wavelength of 1.341 μm is emitted. Fundamental radiation 95 is frequency doubled by means of nonlinear crystal 127 to produce a red output radiation 97 of wavelength 670 nm.

Gain medium 73 is optically coupled to nonlinear crystal 127 at an interface 125 by means of an index-matching fluid 119. Laser cavity 68 comprises curved mirrored facets as shown so as to form a stable cavity. Cavity input facet 71 is coated with an input optical layer 121 to provide a reflectivity of at least 99.5% at the fundamental radiation wavelength and a reflectivity of at least 90% at the output radiation wavelength. A cavity output facet 129 is coated with an output optical layer 123 to provide a reflectivity of at least 99.5% at the fundamental radiation wavelength and a transmission of at least 90% at the output radiation wavelength. In alternative embodiments, either or both of cavity facets 121 and 123 can be a flat surface, and gain medium 73 and nonlinear crystal 127 can be spaced, with intervening optical anti-reflection coatings, to form a configuration similar to that of laser cavity 16 in FIG. 4.

Alternative Embodiments Producing Infrared Radiation

Figure 11:
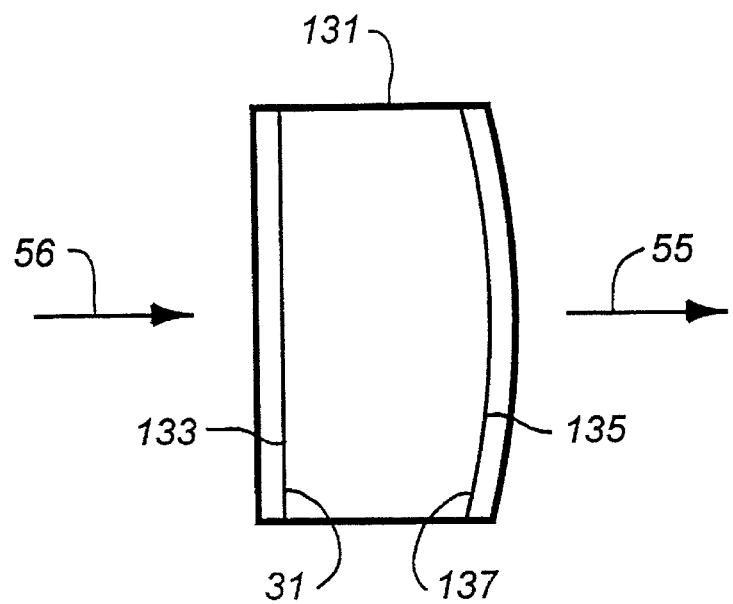
FIG. 11 is a diagrammatical illustration of a laser cavity utilized in an infrared laser producing an output of 930 nm according to the present invention.
Figure 12:
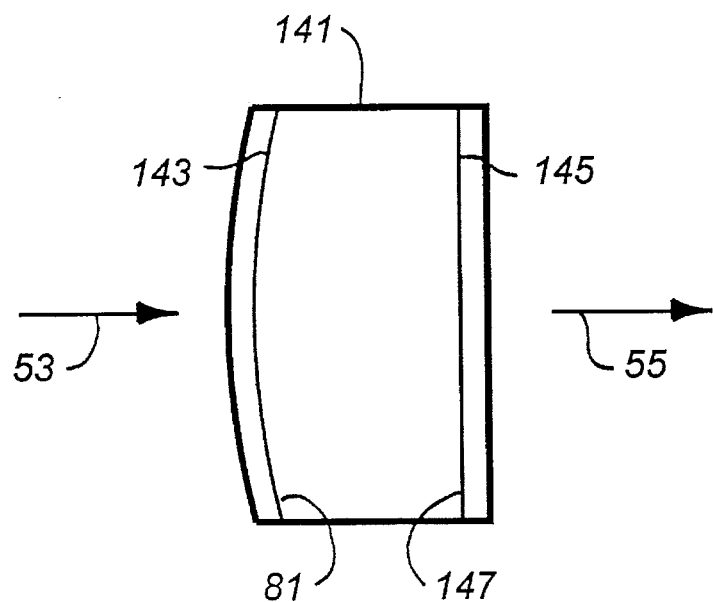
FIG. 12 is a diagrammatical illustration of an infrared laser comprising an external mirror producing an output of 930 nm according to the present invention.

Coherent infrared radiation can be obtained by means of a laser cavity 136, shown in FIG. 11, comprising a Nd:YAlO$_3$ gain medium 133. Pump radiation, such as filtered matched-mode radiation 56, is converted into infrared output radiation 55 at a wavelength of 930 nm. An input facet 131 is coated with input optical layer 31. An output facet 132 is coated with an output optical layer 135 to give reflectivities of at least 97% at the output radiation wavelength and at least 90% at the pump radiation wavelength. Alternatively, input facet 133 can be curved and output facet 135 can be flat, such that a stable cavity results.

An alternative infrared laser cavity 118 comprising input optical layer 76 and Nd:YAlO$_3$ gain medium 23 is shown in FIG. 10. Gain medium 23 comprises input facet 21 and output facet 22, and acts to convert incoming pump radiation, such as mode-matched beam 53, into output radiation 55. Input facet 21 is coated with gain medium optical layer 35 to give a transmission of 80% at the pump radiation wavelength and a reflectivity of less than 2% at the output wavelength. Output facet 22 is coated with an output optical layer 137 to give reflectivities of at least 97% at the output radiation wavelength and at least 90% at the pump radiation wavelength. Alternatively, input optical layer 76 can be flat and output facet 22 can be curved, such that a stable cavity results.

The present invention is advantageously adapted to provide higher peak power levels in a miniaturized blue laser system. While there have been described preferred embodiments of the present invention, it will be readily apparent to those skilled in the art that various changes and modifications may be made therein without departing from the invention, and it is intended in the wording of the appended claims to include such changes and modifications as would be encompassed by the true spirit and scope of the invention.

What is claimed is:

1. A miniaturized laser producing output radiation of wavelength $\lambda_2$, comprising:

a pump source providing pump radiation of wavelength $\lambda_1$ at least at a minimum pump power level P; and a laser cavity comprising: a neodymium-doped yttrium orthoaluminate (Nd:YAlO$_3$) gain medium of thickness L comprising an input facet, said gain medium disposed proximate said pump source such that a beam of said pump radiation comprising a cross-sectional area of $A_P$ is incident upon said input facet, said gain medium operating to convert said beam of pump radiation into a fundamental radiation of wavelength $2\lambda_2$ comprising a laser mode cross-sectional area of $A_L$; and a nonlinear crystal of thickness $L_N$ disposed proximate said gain medium such that said nonlinear crystal acts as a frequency doubler to convert said fundamental radiation into said output radiation, wherein said pump power level P is defined by $$\left(2.3 \times 10^2 \frac{\text{watt}}{\text{cm}^2}\right) \frac{(A_P^2 + A_L^2)}{1 - \exp(-20L \, \text{cm}^{-1})}.$$

2. The laser of claim 1 wherein said pump power level P is at least 120 mW.

3. The laser of claim 1 wherein said gain medium comprises an atomic doping level of at least one percent.

4. The laser of claim 1 further comprising mode-matching means interposed between said pump source and said laser cavity.

5. The laser of claim 4 wherein said mode-matching means comprises an optical lens.

6. The laser of claim 1 further comprising an optical fiber interposed between said pump source and said laser cavity.

7. The laser of claim 1 wherein said pump source comprises a Ti:sapphire laser.

8. The laser of claim 1 wherein said pump source comprises a master oscillator power amplifier (MOPA).

9. The laser of claim 1 wherein said pump radiation wavelength $\lambda_1$ lies within the range of 780 to 820 nm.

10. The laser of claim 1 wherein said output radiation wavelength $\lambda_2$ is approximately 465 to 670 nm.

11. The laser of claim 1 wherein L is at least 0.02 cm.

12. The laser of claim 1 wherein $L_N$ is at least 0.10 cm.

13. The laser of claim 1 wherein said laser cavity further comprises an input optical layer disposed upon said input facet, said input optical layer comprising reflectivity of at least 99.5% at said fundamental radiation wavelength $2\lambda_2$ and a transmission of at least 80% at said pump radiation wavelength $\lambda_1$.

14. The laser of claim 1 wherein said laser cavity further comprises a cavity output facet and an output optical layer disposed upon said cavity output facet, said output optical layer comprising a reflectivity of at least 99.5% at said fundamental radiation wavelength $2\lambda_2$ and a transmission of at least 90% at said output radiation wavelength $\lambda_2$.

15. The laser of claim 1 wherein said gain medium further comprises a gain medium output facet comprising an optical layer, said gain medium output facet optical layer comprising a reflectivity of at least 80% at said pump radiation wavelength $\lambda_1$.

16. The laser of claim 1 wherein said nonlinear crystal further comprises a nonlinear crystal input facet and an optical layer disposed upon said nonlinear input facet, said nonlinear crystal intput facet optical layer having a reflectivity of less than 3% at said fundamental radiation wavelength $2\lambda_2$.

17. The laser of claim 1 further comprising an index-matching fluid disposed between said gain medium and said nonlinear crystal.

18. The laser of claim 17 wherein said index-matching fluid comprises a fluid with an index of refraction intermediate between the index of refraction of said gain medium and the index of refraction of said nonlinear crystal.

19. The laser of claim 1 wherein said nonlinear crystal comprises a material selected from the group consisting of: potassium niobate (KNbO$_3$), beta barium borate ($\beta$-BaB$_2$O$_4$), lithium niobate (LiNbO$_4$), barium sodium niobate (BaNaNb$_5$O$_{12}$), yttrium aluminum borate (YAl$_3$(BO$_3$)$_4$), potassium titanyl phosphate (KTiOPO$_4$), and lithium triborate (LiB$_3$O$_5$).

20. A blue laser producing output radiation of wavelength 465 nm, comprising:

a pump source providing pump radiation of wavelength 780 to 820 nm at least at a minimum pump power level of P;

a neodymium-doped yttrium orthoaluminate (Nd:YAlO$_3$) gain medium of thickness L comprising an input facet, said gain medium disposed proximate said pump source such that a beam of said pump radiation comprising a cross-sectional area of $A_P$ is incident upon said input facet, said gain medium operating to convert said beam of pump radiation into a fundamental radiation of wavelength 930 nm comprising a laser mode cross-sectional area of $A_L$;

a nonlinear crystal of thickness $L_N$ disposed proximate said gain medium such that said nonlinear crystal acts as a frequency doubler to convert said fundamental radiation into said output radiation; and at least one mirror surface providing a reflectivity of at least 99.5% at said fundamental radiation wavelength, wherein said pump power level P is defined by $$\left(2.3 \times 10^2 \frac{\text{watt}}{\text{cm}^2}\right) \frac{(A_P^2 + A_L^2)}{1 - \exp(-20L \text{ cm}^{-1})}.$$

21. The laser of claim 20 wherein said gain medium comprises an atomic doping level of at least one percent.

22. The laser of claim 20 further comprising mode-matching means interposed between said pump source and said gain medium.

23. The laser of claim 20 wherein said pump source comprises a Ti:sapphire laser.

24. The laser of claim 20 wherein said pump source comprises a master oscillator power amplifier (MOPA).

25. The laser of claim 20 wherein L is at least 0.02 cm.

26. The laser of claim 20 wherein $L_N$ is at least 0.10 cm.

27. The laser of claim 20 wherein said gain medium further comprises an output facet and a gain medium optical layer disposed upon said gain medium output facet, said gain medium optical layer comprising a reflectivity of less than 3% at said fundamental radiation wavelength and at said output radiation wavelength.

28. The laser of claim 20 wherein said nonlinear crystal further comprises a nonlinear crystal input facet and an optical layer disposed upon said nonlinear input facet, said nonlinear crystal intput facet optical layer having a reflectivity of less than 3% at said fundamental radiation wavelength.

29. The laser of claim 20 further comprising an index-matching fluid disposed between said gain medium and said nonlinear crystal.

30. The laser of claim 20 wherein said nonlinear crystal comprises a material selected from the group consisting of: potassium niobate (KNbO$_3$), beta barium borate (β-BaB$_2$O$_4$), and yttrium aluminum borate (YAl$_3$(BO$_3$)$_4$).

31. A miniature green laser producing output radiation of wavelength 539 nm, comprising:

a pump source providing pump radiation of wavelength 780 to 820 nm at least at a minimum pump power level of P;

a neodymium-doped yttrium orthoaluminate (Nd:YAlO$_3$) gain medium of thickness L comprising an input facet, said gain medium disposed proximate said pump source such that a beam of said pump radiation comprising a cross-sectional area of $A_P$ is incident upon said input facet, said gain medium operating to convert said beam of pump radiation into a fundamental radiation of wavelength 1.079 μm comprising a laser mode cross-sectional area of $A_L$, said input facet comprising an input optical layer such that said input facet provides a reflectivity of at least 99.5% at the fundamental radiation wavelength; and a nonlinear crystal of thickness $L_N$ comprising an output facet, said nonlinear crystal disposed proximate said gain medium such that said nonlinear crystal acts as a frequency doubler to convert said fundamental radiation into said output radiation, said output facet comprising an output optical layer such that said output facet provides a reflectivity of at least 99.5% at the fundamental radiation wavelength, wherein said pump power level P is defined by $$\left(2.3 \times 10^2 \frac{\text{watt}}{\text{cm}^2}\right) \frac{(A_P^2 + A_L^2)}{1 - \exp(-20L \text{ cm}^{-1})}.$$

32. The laser of claim 31 wherein said gain medium comprises an atomic doping level of at least one percent.

33. The laser of claim 31 further comprising mode-matching means interposed between said pump source and said gain medium.

34. The laser of claim 31 wherein said pump source comprises a Ti:sapphire laser.

35. The laser of claim 31 wherein said pump source comprises a master oscillator power amplifier (MOPA).

36. The laser of claim 31 further comprising an index-matching fluid disposed between said gain medium and said nonlinear crystal.

37. The laser of claim 31 wherein said nonlinear crystal comprises a material selected from the group consisting of: potassium titanyl phosphate (KTiOPO$_4$), lithium triborate (LiB$_3$O$_5$), beta barium borate (β-BaB$_2$O$_4$), lithium niobate (LiNbO$_4$), and barium sodium niobate (BaNaNb$_5$O$_{12}$).

38. A miniature red laser producing output radiation of wavelength 670 nm, comprising:

a pump source providing pump radiation of wavelength 780 to 820 nm at least at a minimum pump power level of P;

a neodymium-doped yttrium orthoaluminate (Nd:YAlO$_3$) gain medium of thickness L comprising an input facet, said gain medium disposed proximate said pump source such that a beam of said pump radiation comprising a cross-sectional area of $A_P$ is incident upon said input facet, said gain medium operating to convert said beam of pump radiation into a fundamental radiation of wavelength 1.341 μm comprising a laser mode cross-sectional area of $A_L$, said input facet comprising an input optical layer such that said input facet provides a reflectivity of at least 99.5% at the fundamental radiation wavelength; and a nonlinear crystal of thickness $L_N$ comprising an output facet, said nonlinear crystal disposed proximate said gain medium such that said nonlinear crystal acts as a frequency doubler to convert said fundamental radiation into said output radiation, said output facet comprising an output optical layer such that said output facet provides a reflectivity of at least 99.5% at the fundamental radiation wavelength, wherein said pump power level P is defined by $$\left( 2.3 \times 10^2 \frac{\text{watt}}{\text{cm}^2} \right) \frac{(A_P^2 + A_L^2)}{1 - \exp(-20L \text{ cm}^{-1})}.$$

39. The laser of claim 38 wherein said gain medium comprises an atomic doping level of at least one percent.

40. The laser of claim 38 further comprising mode-matching means interposed between said pump source and said gain medium.

41. The laser of claim 38 wherein said pump source comprises a Ti:sapphire laser.

42. The laser of claim 38 wherein said pump source comprises a master oscillator power amplifier (MOPA).

43. The laser of claim 38 further comprising an index-matching fluid disposed between said gain medium and said nonlinear crystal.

44. The laser of claim 38 wherein said nonlinear crystal comprises a material selected from the group consisting of: yttrium aluminum borate ($YAl_3(BO_3)_4$), lithium triborate ($LiB_3O_5$), and beta barium borate ($\beta\text{-}BaB_2O_4$).

45. An infrared laser producing output radiation of wavelength 930 nm, comprising:

a pump source providing pump radiation of wavelength 780 to 820 nm at least at a minimum pump power level of P; and a neodymium-doped yttrium orthoaluminate ($Nd:YAlO_3$) gain medium of thickness L comprising an input facet, said gain medium disposed proximate said pump source such that a beam of said pump radiation comprising a cross-sectional area of $A_P$ is incident upon said input facet, said gain medium operating to convert said beam of pump radiation into said output radiation comprising a laser mode cross-sectional area of $A_L$, wherein said pump power level P is defined by $$\left( 2.3 \times 10^2 \frac{\text{watt}}{\text{cm}^2} \right) \frac{(A_P^2 + A_L^2)}{1 - \exp(-20L \text{ cm}^{-1})}.$$

46. The laser of claim 45 wherein said gain medium comprises an atomic doping level of at least one percent.

47. The laser of claim 45 further comprising mode-matching means interposed between said pump source and said gain medium.

48. The laser of claim 45 wherein said pump source comprises a Ti:sapphire laser.

49. The laser of claim 45 wherein said pump source comprises a master oscillator power amplifier (MOPA).

50. The laser of claim 45 wherein said gain medium further comprises an input facet and an input optical layer disposed upon said input facet, said input optical layer comprising reflectivity of at least 99.5% at said output radiation wavelength and a transmission of at least 80% at said pump radiation wavelength.

51. The laser of claim 45 wherein said gain medium further comprises an output facet and an output optical layer disposed upon said output facet, said output optical layer comprising a reflectivity of at least 97% at said output radiation wavelength and a reflectivity of at least 90% at said pump radiation wavelength.

52. The laser of claim 45 further comprising at least one mirror surface providing a reflectivity of at least 97% at said output radiation wavelength.

53. A method of producing infrared radiation at a wavelength of 930 nm, comprising the steps of:

providing pump power of wavelength 780 to 820 nm of at at least a minimum pump power level of P; and pumping a neodymium-doped yttrium orthoaluminate ($Nd:YAlO_3$) gain medium of thickness L, said pump power comprising a cross-sectional area of $A_P$ incident upon an input face of said gain medium, said gain medium operating to convert said pump power into a fundamental radiation comprising a laser mode cross-sectional area of $A_L$, wherein said pump power level P is defined by $$\left( 2.3 \times 10^2 \frac{\text{watt}}{\text{cm}^2} \right) \frac{(A_P^2 + A_L^2)}{1 - \exp(-20L \text{ cm}^{-1})}.$$

54. The method of claim 53 wherein said pump power level P is at least 120 mW.

55. The method of claim 53 wherein said gain medium thickness L is at least 0.02 cm.

* * * * *